United States Patent [19]

Pawlowski et al.

[11] Patent Number: 5,626,655
[45] Date of Patent: May 6, 1997

[54] USE OF CO-SURFACTANTS TO ADJUST PROPERTIES OF INK-JET INKS

[75] Inventors: Norman E. Pawlowski; Loren E. Johnson; Hiang P. Lauw, all of Corvallis; James P. Shields, Philomath; Zia Rehman, Corvallis, all of Oreg.

[73] Assignee: Hewlett-Packard Company, Palo Alto, Calif.

[21] Appl. No.: 634,057

[22] Filed: Apr. 17, 1996

Related U.S. Application Data

[63] Continuation-in-part of Ser. No. 501,262, Jul. 11, 1995, Pat. No. 5,536,306.

[51] Int. Cl.$^6$ ............................................ C09D 11/02
[52] U.S. Cl. ............................. 106/31.27; 106/31.43; 106/31.59
[58] Field of Search ........................ 106/22 R, 20 D, 106/22 H

[56] References Cited

U.S. PATENT DOCUMENTS

| | | | |
|---|---|---|---|
| 4,685,968 | 8/1987 | Palmer | 106/22 R |
| 4,786,327 | 11/1988 | Wenzel et al. | 106/22 R |
| 4,923,515 | 5/1990 | Koike et al. | 106/22 R |
| 4,963,189 | 10/1990 | Hindagolla | 106/22 K |
| 5,085,698 | 2/1992 | Ma et al. | 106/20 R |
| 5,106,416 | 4/1992 | Moffatt et al. | 106/20 R |
| 5,198,023 | 3/1993 | Stoffel | 106/22 R |
| 5,221,334 | 6/1993 | Ma et al. | 106/20 D |
| 5,302,197 | 4/1994 | Wickramanayake et al. | 106/22 H |
| 5,441,561 | 8/1995 | Chujo et al. | 106/20 C |
| 5,534,051 | 7/1996 | Lauw | 106/22 R |
| 5,536,306 | 7/1996 | Johnson et al. | 106/22 R |
| 5,967,980 | 11/1991 | Koike et al. | 106/20 D |

*Primary Examiner*—Helene Klemanski

[57] ABSTRACT

An ink-jet ink composition is provided which includes at least one primary surfactant and at least one co-surfactant, with the co-surfactant having an HLB at least about 1.5 units higher than that of the primary surfactant. The co-surfactant imparts good wetting and cloud point characteristics to the ink-jet ink composition without sacrificing the bleed control achieved with the use of the low-HLB surfactant. The improvement in wetting and cloud point characteristics achieved in the practice of the invention enables ink-jet printers to effect high print quality in a cost-effective manner. A method for increasing the wettability and cloud point of an ink-jet ink by including at least one co-surfactant having an HLB is also provided.

21 Claims, No Drawings

USE OF CO-SURFACTANTS TO ADJUST PROPERTIES OF INK-JET INKS

CROSS-REFERENCE TO RELATED APPLICATIONS

The present application is a continuation-in-part of the application Ser. No. 08/501,262, filed on Jul. 11, 1995, now U.S. Pat. No. 5,536,306, issued Jul. 16, 1996 in the names of Loren E. Johnson et al and entitled "Thermal Ink-Jet Inks Having Reduced Black to Color and Color to Color Bleed", which is directed to a set of color thermal ink-jet ink compositions evidencing reduced color to color and black to color bleed deriving from a disclosed combination of surfactants and inorganic salts. The present application is also related to application Ser. No. 08/500,759, likewise filed on Jul. 11, 1995, now U.S. Pat. No. 5,534,051, issued Jul. 9, 1996 in the name of Hiang P. Lauw and entitled "Specific Dye Set for Thermal Ink-Jet Printing", which is directed to the use of the tetramethylammonium salt of Direct Blue 199 dye for reduced crusting in the ink set disclosed and claimed therein. Both related applications disclose ink vehicles preferably employing a co-surfactant.

TECHNICAL FIELD

The present invention relates to ink compositions employed in ink-jet printing, especially in thermal ink-jet printing, and, more particularly, to adding a combination of surfactants to ink-jet ink compositions to simultaneously reduce bleed between adjacently-printed colors and to improve wetting and cloud point characteristics.

BACKGROUND ART

Ink-jet printing is a non-impact printing process in which droplets of ink are deposited on print media, such as paper, transparency film, or textiles. Low cost and high quality of output, combined with relatively noise-free operation, have made ink-jet printers a popular alternative to other types of printers used with computers. Essentially, ink-jet printing involves the ejection of fine droplets of ink onto print media in response to electrical signals generated by a microprocessor.

There are two common means currently available for achieving ink droplet ejection in ink-jet printing: thermally and piezoelectrically. In thermal ink-jet printing, the energy for drop ejection is generated by electrically-heated resistor elements, which heat up rapidly in response to electrical signals from a microprocessor to create a vapor bubble, resulting in the expulsion of ink through orifices associated with the resistor elements. In piezoelectric ink-jet printing, the ink droplets are ejected due to the vibrations of piezoelectric crystals, again, in response to electrical signals generated by the microprocessor. The ejection of ink droplets in a particular order forms alphanumeric characters, area fills, and other patterns on the print medium.

Many inks that are described for use in ink-jet printing are associated with non-thermal ink-jet printing, such as piezoelectric ink-jet printing. Inks suitably employed in such non-thermal applications often cannot be used in thermal ink-jet printing due to the effect of heating on the ink composition.

In commercially-available thermal ink-jet color printers, such as a DeskJet® printer available from Hewlett-Packard Company, a color spectrum is achieved by combining cyan, magenta, and yellow inks in various proportions. Ink-jet inks are mostly available as dye-based compositions, although a very limited number of black pigment-based ink-jet inks are also available. Titus, cyan, magenta, and yellow inks typically derive their hues from cyan, magenta, and yellow dyes, respectively. The particular set of dyes so employed constitutes a so-called "dye set". Color printers typically employ a four-pen set containing cyan, magenta, and yellow inks as well as a black ink, which is typically used for printing text.

It follows that color thermal ink-jet inks are commonly available as aqueous-based ink compositions that are formulated by dissolving dye in an ink vehicle. For example, a cyan ink would comprise a cyan dye dissolved in an ink vehicle. The dye molecules employed in ink-jet ink compositions are often in the form of dye salts made of a dye anion and a cation such as sodium. These dyes are designed to form solids in the target paper substrate by absorption into paper media by at least two mechanisms. In one mechanism the dye is wicked into the paper and absorbed onto active sites of the paper fiber. There is another mechanism operating in which the ink vehicle evaporates, or is wicked away from the dye, leaving solid dye on and in paper fibers.

Controlling the behavior of printed ink compositions before absorption of the dye salt in the paper media is crucial in attaining good print quality. For example, many thermal ink-jet inks, when printed in various colors on paper substrates, tend to bleed into one another. The term "bleed", as used herein, is defined to be the invasion of one color into another, as evidenced by a visible ragged border therebetween. To achieve superior print quality, it is necessary to have a border between colors that is clean and free from the invasion of one color into the other.

One solution to the problem of color to color bleed between dye-based ink-jet inks involves increasing the penetration rate of the ink into the paper with the use of surfactants. Surfactants lower the surface tension of the ink to increase the penetration rate of the ink into the print medium, thereby reducing the ink's planar spread across and through the print medium into surrounding inks. To effectively control bleed, the surfactant component should be present in the ink above its critical micelle concentration (cmc), as disclosed in U.S. Pat. No. 5,106,416, entitled "Bleed Alleviation Using Zwitterionic Surfactants and Cationic Dyes", issued to John Moffatt et al and assigned to the same assignee as the present application.

Not all surfactants are effective in controlling color bleed between ink-jet inks; rather, there is a large variance in the effectiveness and behavior of surfactants in ink-jet inks. For example, surfactants differ in their solubility in water and, as a consequence, differ in the form they assume in aqueous ink-jet inks. In an aqueous ink-jet ink, surfactants partition themselves between the following three forms: monolayers, soluble form, and micelles. Surfactants that are substantially soluble in water form hydrophilic monolayers at liquid-solid interfaces such as that between the ink and the metal nozzle plate. Such surfactants are termed "Gibbs monolayer formers". In contrast, surfactants that are substantially insoluble in water exist as micelles in aqueous solution, since they are essentially dispersed therein: hydrophilic monolayer formation by such surfactants is essentially nonexistent. Rather, such water-insoluble surfactants form water-insoluble monolayers that are hydrophobic in nature and are termed "Langmuir monolayer formers".

One measuring stick of whether a surfactant forms Gibbs monolayers or Langmuir monolayers is its hydrophilic-lipophilic balance (HLB). The HLB value empirically quantifies the balance between the hydrophilic and hydrophobic parts of a surfactant molecule in terms of both size and strength. HLB values of nonionic surfactants range from 1 to 40, with lower values indicating greater solubility in oil and higher values indicating greater solubility in water.

Regardless of whether a monolayer is hydrophilic or hydrophobic, monolayers of ink on a nozzle plate can develop into bi-layers of ink. Bi-layers form when a second layer of surfactant molecules lay over the monolayer, organizing themselves into a tail-to-tail arrangement thereupon. Both layers of surfactant molecules in a bi-layer formation have their polar heads external to the layer. The likelihood of a monolayer transforming into a bi-layer depends upon the nature of the surfactant and the nature of the material interfacing with the surfactant. More specifically, the formation of bi-layers results in a film surface more compatible with higher energy surfaces.

The degree of surface energy of a material depends on its attractive forces and is expressed in the same units as surface tension. Examples of materials having relatively high surface energies are gold and nickel; orifice plates in ink-jet printers commonly comprise gold, and possibly nickel. Examples of materials having low surface energies are plastics (such as polyethylene) and lipids.

When an aqueous solution containing no surfactant is applied to a surface having low surface energy, the aqueous solution tends to bead up because the low surface energy of the solid cannot pull against the high surface tension of the liquid. By adding a Gibbs-type surfactant to the aqueous solution, the surfactant forms monolayers at the liquid interfaces, both liquid-air and liquid-solid, with the polar head of the surfactant molecule attracted to the aqueous phase and its lipophilic tail pointing out at the interfaces. Such surfactants lower surface tension by disrupting the hydrogen bonding at the aqueous surface and by providing a lipophilic group to mate with the low energy, solid surface.

In ink-jet printing, however, the orifice plate is typically made of a high surface energy material such as gold, and possibly nickel. Therefore, any monolayers formed by surfactants upon the orifice plate would tend to transform into bi-layers given the high surface energy.

Moreover, it has been determined that, especially among nonionic, ionic, and amphoteric surfactants, those having relatively low HLBs offer the best bleed control between ink-jet inks. Specifically, the above-referenced application Ser. No. 08/501,262, now U.S. Pat. No. 5,536,300, discloses the use of primary surfactants that happen to have relatively low HLB values, namely, secondary alcohol ethoxylates such as Tergitol 15-S-5 and Tergitol 15-S-7, which are available from Union Carbide Co. of Houston, Tex. Tergitol 15-S-5 and Tergitol 15-S-7 have HLB values; of about 10.5 and 12.1, respectively. Secondary alcohol ethoxylates contain (a) an aliphatic chain having a prescribed number of carbon atoms in the chain, and (b) a prescribed number of ethoxylated units. Such ethoxylates are commercially available as mixtures of ethoxylates, and so are described in terms of the predominance of a given compound. For example, "Tergitol 15-S-5" represents a secondary alcohol ethoxylate surfactant predominantly having 15 carbons in its aliphatic chain and 5 ethoxylated units. Secondary alcohol ethoxylates suitably employed in Ser. No. 08/501,262 now U.S. Pat. No. 5,536,300 predominantly have about 12 to 18 carbons atoms in the aliphatic chain, while the number of ethoxylated units is predominantly in the range of 4 to 8, and preferably in the range of 5 to 7 units. It is noted that Tergitol 15-S-5, while having a relatively low HLB value, retains some degree of water solubility. Therefore, Tergitol 15-S-5 is not wholly water-insoluble and is not a true "Langmuir monolayer former". For purposes of discussion herein, the Tergitol surfactants are termed "Langmuir-like" monolayer formers, since they impart poor wetting characteristics to aqueous ink solutions, evidenced in the "beading up" of inks containing Tergitol surfactants on metal orifice plate surfaces.

Examples of other surfactants that are successfully employed to control bleed in ink-jet ink compositions include the class of amine oxide surfactants, such as the following: N,N-dimethyl-N-dodecyl amine oxide (NDAO); N,N-dimethyl-N-tetradecyl amine oxide (NTAO); N,N-dimethyl-N-hexadecyl amine oxide (NHAO); N,N-dimethyl-N-octadecyl amine oxide (NOAO); and N,N-dimethyl-N-(9-octadecenyl) amine oxide (OOAO).

It is noted that HLB values for particular surfactants are typically reported as their hydrophilic-lipophilic balances in water, not an aqueous ink system. While the absolute HLB value for a surfactant in water might be a slightly imprecise valuation of its HLB in an aqueous system with 25 wt % co-solvent, the absolute HLB values are still useful in discussing the solubility nature of the surfactant in an aqueous environment. Moreover, it is contemplated that the imprecision in HLB value when employing a co-solvent in an aqueous solution is slight, as evidenced by only a slight increase in cloud point temperature upon adding a co-solvent, as described in greater detail below.

When a surfactant having a relatively low HLB value is dispersed in an aqueous solution, it tends to exist primarily as micelles in solution. At the liquid-solid interface, such surfactants are Langmuir-like monolayer formers and tend to form hydrophobic monolayers, rather than the hydrophilic monolayers formed by relatively high HLB surfactants. When a Langmuir-like monolayer former is employed in an aqueous ink solution along with a high surface energy orifice plate, it tends to form disorganized and hydrophobic monolayers, and sometimes poorly organized bi-layers of surfactant molecules on the liquid-solid interface, with the more polar ends of the surfactant molecules facing toward the solid interface. Consequently, ink containing a surfactant of low HLB, which tends to form monolayers and bi-layers with some Langmuir-type nature, is poorly wetting on a high energy surface such as gold or nickel orifice plates, and the ink will thus form puddles with a high contact angle on these surfaces, rather than wetting with low contact angle and spreading over the gold orifice plate surface.

Wetting characteristics are indicated by contact angle on a given surface, with contact angle being inversely proportional to the degree of wetting imparted to the ink. The formation of puddles evidences a high contact angle on the metal surface, and hence it is concluded that Langmuir-like monolayer formers impart poor wetting characteristics to aqueous ink solutions. In fact, without subscribing to any particular theory, it is speculated that one reason for the relatively low surface tensions of inks containing Tergitol 15-S-5 is the poor wetting of the metal ring used for surface tension measurements, aside from the surfactant's contemplated behavior of disrupting the attractive hydrogen bonding forces at the surface of the liquid.

The poor wetting characteristics of such low HLB surfactants have been found to adversely affect print quality. More particularly, when ink-jet inks made with low-HLB surfactants such as Tergitol 15-S-5 are fired from a thermal ink-jet print cartridge such as one of Hewlett-Packard's DeskJet® printers, the ink tends to form puddles having high contact angles on the metal orifice plates. These puddles of ink may consist of a few small drops of ink or may cover major portions of the metal orifice plate. Regardless, such high-contact-angle puddles, positioned near any orifice, can cause deflection of ink-jet ink drops jetted through the orifice to a print medium. In severe cases, high-contact-angle puddles of ink on the orifice plate can completely occlude an ink-jet orifice. Thus, while surfactants having low HLB values may be effective in controlling bleed in dye-based ink-jet inks by lowering surface tension, these same surfactants do not provide adequate wetting characteristics to the ink.

An additional problem associated with the use of ethoxylated primary surfactants such as Tergitol surfactants is a reduction in ink temperature cloud point. The cloud point of an ink is that temperature at which the primary surfactant comes out of solution, thereby clouding the visible appearance of the ink, which is an undesirable occurrence. In general, the solubility of surfactants increases with temperature. However, the solubility of these ethoxylated primary surfactants decreases as the temperature is raised, such that their solubility is inversely proportional to the temperature of the ink. It follows that an ink containing a surfactant having a low HLB value which also possesses a polyethyleneoxide group at its solubilizing or polar head has a low temperature cloud point above which the surfactant is insoluble. For example, Tergitol 15-S-5 has such a polyethyleneoxide group and exhibits a temperature cloud point of 29° C., above which temperature the surfactant becomes insoluble.

Tergitol 15-S-5 is the most problematic of the Tergitol surfactants with regard to ink temperature cloud point, but Tergitol 15-S-7 also exhibits this problem to a certain extent. As the number of ethoxylated units increases, the cloud point likewise increases to a more desirable temperature, which is expected given the increased solubility deriving from an increased number of ethoxylated units. It is noted that increasing the concentration of an ethoxylated surfactant in an ink-jet ink increases its solubility in the ink and, consequently, also increases the cloud point temperature.

Accordingly, a need exists for an ink-jet ink composition and method of printing that exhibits improved wetting characteristics and an increased cloud point without sacrificing the bleed control achieved with the use of surfactants having low HLB values.

DISCLOSURE OF INVENTION

In accordance with the invention, an ink-jet ink composition is provided which employs a co-surfactant to achieve good wetting and cloud point characteristics in the ink without sacrificing the bleed control achieved with the use of low-HLB surfactants. More specifically, the ink-jet ink composition comprises at least one dye and a vehicle, with the vehicle including at least one first surfactant and at least one second surfactant, with the hydrophilic-lipophilic balance of the second surfactant being at least about 1.5 units higher than that of the first surfactant. The second surfactant is termed a "co-surfactant" herein.

The first surfactant having the lower HLB value provides bleed control to the ink-jet ink composition but does not impart sufficient wettability to the ink to avoid nozzle plate puddling. Moreover, if a higher HLB co-surfactant is not present to counteract the effects of such low-HLB surfactants, the cloud point temperature of the ink is undesirably low. By employing a co-surfactant in accordance with the invention, one essentially shifts the ink-jet ink toward monolayer formation rather than micelle formation, thereby improving wetting and cloud point characteristics.

Specifically, at the ink-orifice plate interface, the addition of a higher HLB co-surfactant provides more polar heads, thereby disrupting the hydrophobic bi-layer film typically formed by low HLB-type surfactants and resulting in better interaction between the bi-layer film and the high energy metal surface. The addition of a higher HLB co-surfactant also improves the ability of an ink-jet pen containing such an ink to recover after being exposed to the atmosphere without a cap.

A method of increasing the wettability and cloud point of an ink-jet ink is also provided which involves formulating an ink-jet ink having the above-described first and second surfactants. Since typical color ink-jet printers employ an ink set having three color inks and a single black ink, it is contemplated that any or all of the four inks may be formulated according to the present invention to achieve high quality priming deriving from (1) reduced print defects due to puddling; (2) clarity of printing due to improved cloud point characteristics; and (3) the retention of bleed alleviation from a low-HLB surfactant. Preferably all four inks in a set of ink-jet inks would be formulated in accordance with the invention for optimum benefit.

The present ink-jet ink compositions and method of increasing the wettability and cloud point of an ink-jet ink may be used with a variety of ink-jet printers such as continuous, piezoelectric drop-on-demand printers and thermal or bubble jet drop-on-demand printers. Printing may be done on a variety of media; examples include paper, textiles, and transparencies. The improvement in wetting and cloud point characteristics achieved in the practice of the invention for ink-jet inks enables ink-jet printers to effect high print quality in a cost-effective manner.

BEST MODES FOR CARRYING OUT THE INVENTION

In the practice of the invention, improved wetting characteristics and increased cloud point temperatures are achieved in ink-jet inks containing surfactants having relatively low HLB values without sacrificing the bleed control attendant to such surfactants. More specifically, a co-surfactant is employed having an HLB exceeding that of the primary surfactant by at least about 1.5 units. The co-surfactant imparts greater wettability to the ink, as evidenced by a lower contact angle between the ink and a metal surface such as an orifice plate. It follows that ink with increased wettability spreads more evenly over the orifice plate. Therefore, not only are such inks less likely to puddle on the orifice plate, but higher wetting inks residing on the orifice plate are more easily drawn back into the print cartridge by back pressure if in contact with the ink meniscus in an orifice.

All concentrations herein are in weight percent, unless otherwise indicated. The purity of all components is that employed in normal commercial practice for ink-jet inks.

The co-surfactants of the present invention are helpful in improving the wetting and cloud point characteristics of inks containing relatively low HLB surfactants. Low HLB surfactants are employed in ink-jet ink compositions to achieve bleed control. More specifically, in above-referenced application Ser. No. 08/501,262, now U.S. Pat. No. 5,536,306, the color inks each include a surfactant component comprising about 1 to 4 wt % of a secondary alcohol ethoxylate surfactant predominantly having 4 to 8 ethoxylated units and an aliphatic chain of about 12 to 18 carbon atoms. Secondary alcohol ethoxylates serve to prevent color to color bleed by increasing the penetration of the inks into the print medium.

Secondary alcohol ethoxylates are nonionic surfactants and are commercially-available, for example, from Union Carbide Co. (Houston, Tex.) as the Tergitol series, such as Tergitol 15-S-5 and Tergitol 15-S-7.

More specifically, secondary alcohol ethoxylates contain (a) an aliphatic chain having a prescribed number of carbon atoms in the chain and (b) a prescribed number of ethoxylated units. These ethoxylates are commercially available as mixtures of ethoxylates, and so are described in terms of the predominance of a given compound. Thus, "Tergitol 15-S-5" represents a secondary alcohol ethoxylate surfactant predominantly having 15 carbons in its aliphatic chain and 5 ethoxylated units. A mixture of secondary alcohol ethoxylates in which the predominant number of ethoxylated units is less than 4 is not very soluble in the ink, while if the predominant number of ethoxylated units is greater than 8, the surfactant loses effectiveness in preventing color bleed. The following table provides HLB values for various mixtures of secondary alcohol ethoxylates:

TABLE 1

HLB Values for Specific Tergitol Surfactants.

| Tergitol Surfactant | HLB value |
|---|---|
| 15-S-3 | 8.0 |
| 15-S-5 | 10.5 |
| 15-S-7 | 12.1 |
| 15-S-9 | 13.3 |
| 15-S-12 | 14.5 |
| 15-S-15 | 15.4 |
| 15-S-20 | 16.3 |
| 15-S-30 | 18.0 |

Tergitol 15-S-9, with an HLB value of 13.3, represents borderline insolubility in water, while Tergitol 15-S-12 is considered to be soluble in water.

Other classes of surfactants may benefit from the use of co-surfactants, including the class of amine oxide surfactants, such as the following: N, N-dimethyl-N-dodecyl amine oxide (NDAO); N,N-dimethyl-N-tetradecyl amine oxide (NTAO); N,N-dimethyl-N-hexadecyl amine oxide (NHAO); N,,N-dimethyl-N-octadecyl amine oxide (NOAO); and N,N-dimethyl-N-(9-octadecenyl)amine oxide (OOAO).

It is important to note that the class of low HLB-type surfactants targeted in the practice of the invention is not limited to the above-described Tergitol series surfactants and amine oxides. Rather, any surfactant having a relatively low HLB is contemplated to be encompassed by the practice of the invention. Although what is termed a "relatively low HLB" will vary by the type of surfactant, in general, an HLB value is relatively low if it does not exceed 13. Generally, each so-called "class" of surfactants has members of varying HLB values, and according to McCutcheon's Volume 1: Emulsifiers and Detergents (1995 North American Edition), there are approximately sixty (60) classes of surfactants. Accordingly, it is contemplated that there are numerous surfactants having relatively low HLB values that may benefit from association with a higher-HLB co-surfactant in accordance with the invention.

Thus, it is contemplated that the practice of the invention will benefit any inks containing surfactants with relatively low HLB values. Inks containing surfactants with higher HLB values do not experience the same degree of partitioning to micelle formation, but rather are more likely to form monolayers. It is contemplated that the primary, low-HLB-type surfactant ranges in concentration from about 0.5 to 5 wt % of the ink-jet ink composition, although a concentration range of about 1 to 2.5 wt % is preferred for bleed control without degradation of print quality. If the concentration of primary surfactant is too high, the prim quality suffers from loss of edge acuity.

The co-surfactant component may be any surfactant having an HLB value that is at least 1.5 units higher than that of the primary surfactant, thereby countering the primary surfactant's tendency to partition more toward micelle formation and the resulting poor wetting characteristics. Preferably, the HLB of the co-surfactant is at least 2 units higher than that of the primary surfactant, and most preferably 3 units higher. Examples of suitably employed co-surfactants include, but are not limited to, diphenyl disulfonate derivatives, which are anionic surfactants; certain secondary ethoxylated alcohols; and certain amine oxides.

Rather than address the problem of bleed, the presence of this second surfactant serves to correct a sporadic problem that results in mis-directed drops of ink due to puddling of ink on the nozzle plate as a consequence of different surface energies on the nozzle plate. Examples of suitably-employed diphenyl sulfonate derivatives include, but are not limited to: (1) the Calfax family of surfactants, commercially available from Pilot Chemical; (2) Dowfax 8390, a sodium n-hexadecyl diphenyloxide disulfonate commercially available from Dow Chemical having an HLB value of about 14.4; and (3) Poly-Tergent 4C3, a sodium hexadecyl diphenyl ether disulfonate commercially available from Olin Chemical having an HLB value of about 14.4. More specifically, suitable members of the Calfax family of surfactants include Calfax 16L-35, which is a sodium n-hexadecyl diphenyloxide disulfonate having an HLB of about 14.4, and Calfax 10L-45, which is a sodium n-decyl diphenyloxide disulfonate having an HLB of about 17.8.

Examples of secondary ethoxylated alcohols that may be suitably employed as a co-surfactant include, but are not limited to, Tergitols having at least 9 ethoxylated units, although a Tergitol surfactant having 7 ethoxylated units might slightly improve the wetting characteristics of Tergitol 15-S-5. The HLB value of a Tergitol is directly proportional to its number of ethoxylated units. Therefore, while surfactants in Union Carbide's Tergitol family with about 4 to 8 ethoxylated units have low HLB values, Tergitols having more than 9 ethoxylated units have HLB values reflecting at least a borderline solubility in water. The greater the number of ethoxylated units, such as Tergitol 15-S-30 with an HLB of about 18.0 (see Table 1 above), the greater the solubility in water and the more useful the Tergitol is as a co-surfactant.

It is noted that while a Tergitol co-surfactant should essentially have an HLB of more than about 12 (corresponding to at least about 9 ethoxylated units) to properly serve as a co-surfactant in accordance with the invention, this HLB standard is not universal among all classes of surfactants. A surfactant with an HLB of only 12 might be effective in improving wetting characteristics of an ink if the polar group of the surfactant were an amine oxide or a betaine, which are very good zwitterions for interaction with gold surfaces. In comparison, ethoxylated surfactants are not as polar in their wetting, such that the outside surface of the bi-layer does not wet a gold surface as well. Therefore, ethoxylated surfactants typically require higher HLB values to properly serve as co-surfactants in accordance with invention, compared to other types of surfactants such as amine oxides and betaines.

An example of a suitably-employed amine oxide surfactant as a co-surfactant is N-octyldecenyl-N,N- dimethlyamine oxide, which is commonly known as oleamine oxide and is commercially available from Henkel Corporation under the tradename Standamox 01. Another amine oxide surfactant that may suitable serve as a co-surfactant in accordance with the invention is dimethyl myristyl amine oxide.

It is important to note that the class of high HLB-type surfactants employed as co-surfactants in the practice of the invention is not limited to the above-mentioned diphenyl disulfonate derivatives, Tergitol series surfactants having at least 9 ethoxylated units, and specific amine oxides. Rather, any surfactant having an HLB reflecting some degree of water solubility is contemplated to be capable of serving as a co-surfactant in accordance with the invention. Again, there are approximately sixty (60) accepted classes of surfactants, each of which have surfactants of varying HLB values. Accordingly, it is contemplated that there are numerous surfactants having sufficiently high HLB values that may serve as a co-surfactant in the practice of the invention. Examples of additional classes of surfactants that include suitably-employed co-surfactants are betaines, sorbitan derivatives, sulfonated alkyls, sulfonated alcohols, sulfates of ethoxylated alcohols, and sulfates of ethoxylated alkyls.

The amount of co-surfactant necessary and appropriate for addition to an ink containing a low-HLB surfactant to achieve improved wetting and cloud point characteristics depends upon the amount and type of primary surfactant. One having ordinary skill in the art would be well capable of determining the amount of co-surfactant by simply adding co-surfactant to an ink-jet ink containing a surfactant having a low HLB value until the desired degree of wetting and/or cloud point temperature is attained. As a guideline, the smaller the differential in HLB value between the primary surfactant and the co-surfactant, the higher the concentration of co-surfactant required to achieve the objectives of the invention. It is considered routine experimentation, as opposed to undue experimentation, to determine the appropriate amount of co-surfactant to add to a particular ink system containing a low-HLB surfactant. It is contemplated that the amount of co-surfactant will be within the range of about 0.1 to 0.4 wt % in most applications. As an example, it has been determined that for ink-jet inks containing about 2.25 wt % Tergitol 15-S-5, better wetting is obtained with the addition of 0.1 to 0.25 wt % of a more soluble co-surfactant.

It is noted that an excessive amount of co-surfactant may cause a loss of edge acuity in print quality just as would an excessive amount of primary surfactant. Moreover, co-surfactants do not impart as much bleed control to ink-jet inks in comparison to the primary surfactants. Therefore, an excessive amount of co-surfactant might dominate the surfactant system in an ink-jet ink and have an adverse effect on overall print quality. It is contemplated that the definition of what is "excessive" will vary with each co-surfactant. However, as an example, it has been determined that Calfax 10L-45 may be employed up to about 0.5 wt % of an ink-jet ink composition as a co-surfactant. Above 0.5 wt % of Calfax 10L-4.5, a loss in print quality due to reduced edge acuity and bleed control is readily apparent.

It is noted that surface tension alone does not indicate the wetting tendencies of an ink and therefore cannot be used to assess the need for a co-surfactant. In fact, the addition of a co-surfactant in accordance with the invention will likely increase the surface tension of the ink. For example, an ink having the following composition has a surface tension of 28.5 dyne/cm: (a) 3 wt % dye; (b) 8 wt % 1,5-pentanediol; (c) 7.5 wt % ethylhydroxypropanediol; (d) 7.5 wt % 2-pyrrolidone; (e) 6 wt % $Mg(NO_3)_2 \cdot 6H_2O$; (f) 2.0 wt % Tergitol 15-S-5; (g) 0.2 wt % each of biocide and buffer; and (h) the balance water. Upon adding about 0.25 wt % of either Calfax 10L-45 or about 0.25 wt % Tergitol 15-S-30, the surface tension increases to 29.4 dyne/cm. However, the wetting characteristics of the ink improve as evidenced by visual inspection of the contact angle of the ink with a metal surface. The increase in surface tension may be due to the nature of monolayers at the liquid-air interface, where surface tension is measured. Alternatively, the increase in surface tension may be due to the film interacting poorly with the platinum ring used to measure surface tension.

While it is contemplated that the present co-surfactant may benefit any ink-jet ink having a relatively low HLB, such as less than about 13, color ink-jet inks comprising the following components are specifically contemplated: (a) about 0.1 to 4 wt % of at least one dye; (b) about 3 to 20 wt % of at least one diol; (c) 0 to about 5 wt % of at least one glycol ether; (d) about 3 to 9 wt % of 2-pyrrolidone; (e) up to about 4 wt % of at least one component selected from the group consisting of biocides and buffers; (f) about 1 to 4 wt % of a first surfactant consisting essentially of at least one secondary alcohol ethoxylate surfactant predominantly having 4 to 8 ethoxylated units and an aliphatic chain having about 12 to 18 carbon atoms; (g) about 3 to 6 wt % of at least one inorganic salt component (for black to color bleed); and (h) water. Thus, in the practice of the invention, it is contemplated that between about 0.1 and 0.4 wt % of a co-surfactant is added to the preceding ink composition to improve the wetting and cloud point characteristics thereof.

It is contemplated that any dye that is compatible with the remaining components of the ink-jet ink composition may be employed in the practice of the invention. Examples of suitable dyes include, but are not limited to, Acid Blue 9, Direct Blue 199, Reactive Red 180, Acid Red 52, and Acid Yellow 23.

Diols preferably employed in the present ink-jet ink compositions include any of, or a mixture of two or more of, such compounds as ethanediols (e.g., 1,2-ethanediol); propanediols (e.g., 1,2-propanediol, 1,3-propanediol, 2-ethyl-2-hydroxy-methyl-1,3-propanediol, ethylhydroxypropanediol (EHPD), etc.); butanediols (e.g., 1,3-butanediol, 1,4-butanediol, etc.); pentanediols (e.g., 1,5-pentanediol); and hexanediols (e.g., 1,6-hexanediol, 2,5-hexanediol, etc.). Preferably, 1,5-pentanediol and EHPD are employed in the practice of the invention.

The glycol ether component preferably employed in the present ink vehicle includes any of the glycol ethers and thioglycol ethers commonly employed in the inks used in ink-jet printing, or a mixture thereof. Examples of such compounds include polyalkylene glycols such as polyethylene glycols (e.g., diethylene glycol, triethylene glycol, tetraethylene glycol, etc.); polypropylene glycols (e.g., dipropylene glycol, tripropylene glycol, tetrapropylene glycol, etc.); polymeric glycols (e.g., PEG 200, PEG 300, PEG 400, PPG 400, etc.); and thiodiglycol. More preferably, diethylene glycol is employed.

Preferably, the concentration of pentanediol and glycol component in each color ink is given by the formula $2 \times [DEG] + [pentanediol] = $ about 6 to 10 wt %, where the square brackets denote the concentration in weight percent. For the more preferred cyan and magenta ink compositions, DEG is absent and 1,5-pentanediol is present in the range of about 7 to 9 wt %, and most preferably about 7.5 to 8.5 wt %. For the more preferred yellow ink composition, the amount of DEG ranges from about 3 to 5 wt % and most preferably about 3.5 to 4.5 wt %, and 1,5-pentanediol is absent.

EHPD is considered separately and is present in each ink in an amount in the range of about 6 to 9 wt %. For the cyan and magenta inks, EHPD is preferably present within the range of about 7 to 8 wt %, while for the yellow ink, EHPD is preferably present within the range of about 7.5 to 8.5 wt %.

Consistent with the requirements for this invention, various types of other additives may be employed in the ink to optimize the properties of the ink composition for specific applications. For example, as is well known to those skilled in the art, one or more biocides, fungicides, and/or slimicides (microbial agents) may be used in the ink composition as is commonly practiced in the art. Any of the biocides commonly employed in ink-jet inks may be employed in the practice of the invention, such as NUOSEPT 95, available from Hüls America (Piscataway, N.J.); PROXEL GXL, available from ICI America (Wilmington, Del.); and glutaraldehyde, available from Union Carbide Company (Bound Brook, N.J.) under the trade designation UCAR-CIDE 250. PROXEL GXL is the preferred biocide. Additionally, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

Buffers employed to modulate pH of the present preferred ink composition should be organic-based biological buffers, since inorganic buffers, if employed, would likely precipitate in the presence of the relatively large amount of inorganic salts in the ink composition. Further, the buffer employed should provide a pH ranging from about 6 to 9 in the practice of the invention. Examples of preferably-employed buffers include 2-amino-2-(hydroxymethyl)-1,3-propanediol (Trisma Base), which is available from, for example, Aldrich Chemical (Milwaukee, Wis.), and 2-[N-morpholino]-ethanesulfonic acid (MES), sodium salt.

The amount of the secondary alcohol ethoxylate preferably employed in the final ink-jet ink composition is given by the sum of the two Tergitol components, 15-S-5 and 15-S-7, according to the formula

[15-S-5]+[15-S-7]=about 1 to 4 wt %, where the square brackets denote the concentration in weight percent. Preferably, Tergitol 15-S-5 alone is present in the cyan and magenta inks in the range of about 1.5 to 3 wt % and most preferably about 1.5 to 2.5 wt %. In the yellow ink, a mixture of the two Tergitols is preferably employed, with 15-S-5 ranging from about 0.5 to 2 wt % and 15-S-7 ranging from about 1 to 2 wt %; in the most preferred case for the yellow ink, 15-S-5 ranges from about 0.8 to 1.2 wt % and 15-S-7 ranges from about 1.3 to 1.7 wt %.

The metal salt component of the preferred ink vehicle serves to prevent bleed between black ink and the color inks, and comprises one or more inorganic salts. The salts must, of course, be soluble in the ink in the concentration employed. Suitably-employed cations for the salt include alkaline earth metals of group 2A of the periodic table (e.g., magnesium and calcium); the transition metals of group 3B of the periodic table (e.g., lanthanum); cations from group 3A of the periodic table (e.g., aluminum); and lanthanides (e.g., neodymium). Preferably, calcium and magnesium are employed as cations in the practice of the invention. Suitably-employed anions associated with calcium include nitrate, chloride, acetate, benzoate, formate, and thiocyanate, while suitable anions associated with magnesium include nitrate, chloride, acetate, benzoate, bromide, citrate, formate, iodide, sulfate, fluoride, tartrate, and thiocyanate. Salts preferably employed in the practice of the invention are the nitrate, chloride, and acetate salts of calcium and magnesium. More specifically, the cyan and magenta inks of the present invention preferably employ magnesium nitrate while the yellow ink preferably employs calcium nitrate.

Finally, another optional component that may be employed in the present ink vehicles is ammonium nitrate, which is used in conjunction with calcium-containing inorganic salts. Ammonium nitrate serves to prevent the precipitation of such calcium-containing inorganic salts in the ink upon exposure to the carbon dioxide in the air.

Anti-kogation of the inks is achieved by well-known substitution of cations on certain dyes with other cations. For example, sodium cations associated with Direct Blue 199 (used in the cyan ink) are substantially totally replaced with tetramethyl ammonium (TMA) cations, while sodium cations associated with Acid Red 52 (used in the magenta ink) are substantially totally replaced with lithium cations, and sodium cations associated with Acid Yellow 23 (used in the yellow ink) are substantially totally replaced with TMA cations.

Therefore, cyan ink is preferably formulated by combining purified Acid Blue 9 and Direct Blue 199 anionic dyes with the above-described preferred ink vehicle, the latter dye being particularly known for providing high light fastness. Given the relatively high metal salt concentration in the cyan ink, Direct Blue 199 associated with sodium or ammonium would likely precipitate out of the vehicle. Thus, Direct Blue 199 is treated to substantially replace all or most of the as-supplied sodium or ammonium cation with TMA cation. The Acid Blue 9 anionic dye may remain associated with sodium in the practice of the invention. The substitution of TMA in Direct Blue 199 reduces crusting about the orifice attributable to cyan ink and enables the cyan ink to remain in solution in the presence of a relatively high concentration of inorganic salts. Since the Acid Blue 9 anionic dye may remain associated with sodium in the practice of the invention, the amount of Acid Blue 9 must be limited such that the presence of its associated sodium cation does not undo the benefits achieved by replacing the sodium or ammonium cation of Direct Blue 199 with TMA. Preferably, Direct Blue 199 and Acid Blue 9 are employed at concentrations ranging from about 2 to 3 wt % and 1 to 2 wt %, respectively. More preferably, the ratio of the concentration of Direct Blue 199 dye to the concentration of Acid Blue 9 dye in the present cyan ink is about 2:1 by weight.

A variety of methods may be used to replace the sodium or ammonium ion associated with Direct Blue 199 with TMA. Examples of such ion-exchange processes are disclosed in U.S. Pat. Nos. 4,685,968 and 4,786,327, both assigned to the same assignee as the present invention. The method of forming the TMA form of the DB 199 dye forms no part of this invention.

All told, the cyan ink is preferably prepared according to the following formulation and buffered to a pH of about 8:

(a) about 0.1 to 4 wt % of a mixture of Direct Blue 199-TMA and Acid Blue 9-Na, with Direct Blue 199-TMA more preferably present at about 2 to 3 wt % and Acid Blue 9-Na more preferably present at about 1 to 2 wt %, most preferably with the ratio by weight of Direct Blue 199 to Acid Blue 9 being about 2:1;

(b) a mixture of DEG and 1,5-pentanediol given by the formula

2×[DEG]+[pentanediol]=about 6 to 10 wt % and about 6 to 9 wt % ethylhydroxypropanediol (EHPD), with 1,5-pentanediol being more preferably present at about 7 to 9 wt % (and DEG absent) and most preferably about 7.5 to 8.5 wt %, and with EHPD being preferably present at about 7 to 8 wt % of the ink composition;

(c) about 3 to 9 wt % of 2-pyrrolidone, with about 6 to 9 wt % being more preferable and about 7 to 8 wt % being most preferable;

(d) about 3 to 6 wt % of a mixture of magnesium nitrate and/or calcium nitrate, with 4 to 5 wt % magnesium nitrate alone being more preferable;

(e) about 1 to 4 wt % of a mixture, of Tergitol 15-S-5 and/or Tergitol 15-S-7, with Tergitol 15-S-5 being more preferably employed alone ranging from about 1.5 to 3 wt % or, most preferably, 1.5 to 2.5 wt %;

(f) up to about 0.4 wt % of Dowfax 8390 surfactant, with about 0.3 to 0.4 wt % being more preferable;

(g) about 0.1 to 1 wt % of a buffer, preferably Trisma Base or MES, more preferable Trisma Base;

(h) up to about 1 wt % of a biocide, preferably PROXEL GXL; and (i) the balance water.

The magenta ink employed in the practice of the invention is preferably formulated by combining purified Reactive Red 180 in its hydrolyzed form and purified Acid Red 52 anionic dye with an ink vehicle comprised of the above-described components and concentration ranges. The Acid Red 52 anionic dye is preferably treated to replace the as-supplied sodium cation with lithium. Preferably, the ratio of the concentration of Reactive Red 180 to the concentration of Acid Red 52 in the present magenta ink is about 1:1 by weight. Any of a variety of methods may be used to replace the sodium ion associated with Acid Red 52 with lithium, such as an ion-exchange process. The method of forming the lithium form of the dye forms no part of this invention.

Preferably, the magenta ink is prepared according to the following formulation and is buffered to a pH of about 7:

(a) about 0.1 to 4 wt % of a mixture of Reactive Red 180 and Acid Red 52-Li, with the ratio by weight of Reactive Red 180 to Acid Red 52 being more preferably about 1:1;

(b) a mixture of DEG and 1,5-pentanediol given by the formula

2×[DEG]+[pentanediol]=about 6 to 10 wt % and about 6 to 9 wt % ethylhydroxypropanediol (EHPD), with 1,5-pentanediol being more preferably present at about 7 to 9 wt % (and DEG absent) and most preferably about 7.5 to 8.5 wt %, and with EHPD being preferably present at about 7 to 8 wt % of the ink composition;

(c) about 3 to 9 wt % of 2-pyrrolidone, with about 6 to 9 wt % being more preferable and about 7 to 8 wt % being most preferable;

(d) about 3 to 6 wt % of a mixture: of magnesium nitrate and/or calcium nitrate, with 4 to 5 wt % magnesium nitrate alone being more preferable;

(e) about 1 to 4 wt % of a mixture: of Tergitol 15-S-5 and/or Tergitol 15-S-7, with Tergitol 15S-5 being more preferably employed alone ranging from about 1.5 to 3 wt % or, most preferably, 1.5 to 2.5 wt %;

(f) up to about 0.4 wt % of Dowfax 8390 surfactant, with about 0.3 to 0.4 wt % being more preferable;

(g) about 0.1 to 1 wt % of a buffer, preferably Trisma base or MES, more preferably MES;

(h) up to about 1 wt % of a biocide, preferably PROXEL GXL; and (i) the balance water.

The yellow ink employed in the practice of the invention is formulated by combining purified Acid Yellow 23 anionic dye with an ink vehicle comprising the above-described components and concentration ranges. The Acid Yellow 23 anionic dye is preferably treated to replace the as-supplied sodium cation with tetramethylammonium, which may be accomplished by a process such as ion-exchange. The method of forming the TMA form of the dye forms no part of this invention.

Preferably, the yellow ink is prepared according to the following formulation and buffered to a pH of about 6.5:

(a) about 0.1 to 4 wt % of Acid Yellow 23-TMA;

(b) a mixture of DEG and 1,5-pentanediol given by the formula

2×[DEG]+[pentanediol]=about 6 to 10 wt % and about 6 to 9 wt % ethylhydroxypropanediol, with the DEG being more preferably present in the mixture at about 3 to 5 wt % (and 1,5 pentanediol absent) and most preferably about 3.5 to 4.5 wt %, and the ethylhydroxypropanediol being more preferably present at about 7.5 to 8.5 wt %;

(c) about 3 to 9 wt % of 2-pyrrolidone, with about 3 to 5 wt % being more preferable and about 3.5 to 4.5 wt % being most preferable;

(d) about 3 to 6 wt % of a mixture of magnesium nitrate and/or calcium nitrate, with 4 to 5 wt % calcium nitrate alone being more preferable;

(e) about 1 to 4 wt % of a mixture, of Tergitol 15-S-5 and/or Tergitol 15-S-7, with a mixture of about 0.5 to 2 wt % Tergitol 15-S-5 and about 1 to 2 wt % Tergitol 15-S-7 being more preferable or, most preferably, a mixture of about 0.8 to 1.2 wt % Tergitol 15-S-5 and about 1.3 to 1.7 wt % Tergitol 15-S-7;

(f) up to about 0.4 wt % of Dowfax 8390 surfactant, with about 0.3 to 0.4 wt % being more preferable;

(g) about 0.1 to 1 wt % of a buffer, preferably Trisma base or MES;

(h) up to about 1 wt % of a biocide, preferably PROXEL GXL; and (i) the balance water.

Finally, the black ink employed along with the above-described color ink-jet inks may be any dye-based or a pigment-based ink that is suitably employed in thermal ink-jet printing. Suitable black dye-based inks are disclosed and claimed, for example, in U.S. Pat. No. 4,963,189, entitled "Waterfast Ink Formulations with a Novel Series of Anionic Dyes Containing Two or More Carboxyl Groups" and assigned to the present assignee. Suitable black pigment-based inks are disclosed and claimed, for example, in U.S. Pat. No. 5,085,698, entitled "Aqueous Pigmented Inks for Ink Jet Printers", in U.S. Pat. No. 5,221,334, entitled "Aqueous Pigmented Inks for Ink Jet Printers", and in U.S. Pat. No. 5,302,197, entitled "Ink Jet Inks", all assigned to E. I. Du Pont de Nemours and Company.

Ink-jet ink compositions containing a first surfactant with a relatively low HLB that are formulated in accordance with the invention to also comprise a second surfactant with an HLB that is at least about 1.5 units higher will exhibit improved wetting and cloud point characteristics while retaining their bleed-alleviation characteristics.

In addition to improving wetting and cloud point temperature, the addition of a higher HLB co-surfactant improves the ability of an ink-jet pen containing such an ink to recover after being exposed to the atmosphere without a cap. Generally, surfactants having higher HLB values are more soluble and decrease the tendency for hard plugs to form in the ink-jet printer nozzles. Specifically, hard plugs form from the solid ingredients in an ink composition in the manner of residue remaining when the volatiles such as water evaporate from ink. Surfactants having more polar heads, i.e. higher HLB values, have a greater tendency to hold water of hydration.

The examples below demonstrate the improved wetting and cloud point characteristics achieved in the practice of the invention.

EXAMPLES

To demonstrate the effectiveness of a high-HLB co-surfactant in imparting wettability to an ink-jet ink containing a low-HLB surfactant, the following cyan ink-jet ink was formulated:

(a) about 1.2 wt % Acid Blue 9-Na and about 2 wt % Direct Blue 199-TMA;

(b) about 8 wt % 1,5-pentanediol;

(c) about 7.5 wt % 2-pyrrolidone;

(d) about 7.5 wt % ethylhydroxypropanediol;

(e) about 6 wt % of $Mg(NO_3)_2 \bullet H_2O$;

(f) about 2.25 wt % Tergitol 15-S-5;

(g) about 0.2 wt % each of Trisma Base and Proxel GXL; and (h) the balance water.

The above-described ink-jet ink composition had a surface tension of about 29.4 dynes/cm and a contact angle of roughly about 100° on gold, the angle having been visually estimated. Given the low wettability of this ink, it exhibited unacceptable print defects deriving from puddle formation on the orifice plate while printing. In accordance with the invention, about 0.25 wt % of Tergitol 15-S-5 was replaced with about 0.25 wt % Calfax 16L-35, with the resulting ink-jet ink composition having a surface tension of about 30.5 dyne/cm and a reduced contact angle of roughly about 2° or less on gold, as visually estimated. This increase in wettability greatly reduced puddling on the orifice plate such that a substantial reduction in print defects was achieved, along with an overall improvement in print quality.

To demonstrate the effectiveness of a high-HLB co-surfactant in increasing the cloud point temperature of an ink-jet ink containing a low-HLB co-surfactant, the above-described ink, which had a cloud point temperature of about 29° C., was formulated with various types and concentrations of co-surfactants as provided below in Table 2:

TABLE 2

Effect on Cloud Point of Ink-Jet Ink by Co-Surfactants.

| Co-Surfactant | Concentration, wt % | Cloud Point, °C. |
|---|---|---|
| None | 0.0 | 29 |
| Calfax 10L-45 | 0.12 | 40 |
| Calfax 10L-45 | 0.25 | 50 |
| Calfax 10L-45 | 0.34 | 61–61.5 |
| Calfax 10L-45 | 0.5 | 74–75 |
| Calfax 10L-45 | 0.75 | 91–92 |
| Tergitol 15-S-30 | 0.25 | 52 |
| N-octyldecenyl-N,N-dimethylamine oxide | 0.25 | 38 |

Therefore, it is demonstrated that by adding the indicated concentrations of co-surfactant, an increase in cloud point temperature is achieved. Given that the base cloud point was only 29° C., the ink without co-surfactant would regularly suffer from cloudiness in thermal ink-jet priming.

Thus, it has been demonstrated that the addition of a proper amount of co-surfactant can impart improved wetting and cloud point characteristics to an ink-jet ink containing a surfactant having a relatively low HLB, thereby improving overall print quality by minimizing both precipitation of the low-HLB surfactant as well as print defects due to ink puddling on the orifice plate.

INDUSTRIAL APPLICABILITY

The present ink-jet ink compositions and method of increasing wettability and cloud point of an ink-jet ink as disclosed herein are expected to find commercial use in ink-jet printing.

Thus, there has been disclosed an ink-jet ink composition which exhibits improved wetting and cloud point characteristics by employing a co-surfactant having a relatively higher HLB value that is complementary to a primary surfactant having a low HLB value. A method of increasing wettability and cloud point in an ink-jet ink is also disclosed which employs such an ink-jet ink composition to achieve improved print quality. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. An ink-jet ink composition comprising at least one substantially water-soluble dye and a vehicle, said vehicle including at least one first surfactant and at least one second surfactant, said at least one second surfactant having a hydrophilic-lipophilic balance that is at least about 1.5 units higher than that of said at least one first surfactant.

2. The ink-jet ink composition of claim 1 wherein said at least one first surfactant has a hydrophilic-lipophilic balance of less than about 13 and wherein said at least one second surfactant has a hydrophilic-lipophilic balance of at least about 12.

3. The ink-jet ink composition of claim 2 wherein said at least one first surfactant is a secondary alcohol ethoxylate surfactant predominantly having 4 to 8 ethoxylated units.

4. The ink-jet ink composition of claim 3 wherein said secondary alcohol ethoxylate surfactant has an aliphatic chain of about 12 to 18 carbon atoms.

5. The ink-jet ink of claim 4 wherein said secondary alcohol ethoxylate surfactant is selected from the group consisting of secondary alcohol ethoxylate surfactant predominantly having 5 ethoxylated units and an aliphatic chain of about 15 carbon atoms, a secondary alcohol ethoxylated surfactant predominantly having 7 ethoxylated units and an aliphatic chain of about 15 carbon atoms, and mixtures thereof.

6. The ink-jet ink composition of claim 1 wherein said at least one first surfactant is present in said ink-jet ink composition at a concentration ranging from about 0.5 to 5 wt % of said ink-jet ink composition.

7. The ink-jet ink composition of claim 1 wherein said at least one second surfactant is selected from the group consisting of diphenyl sulfonate derivatives, secondary ethoxylated alcohols, amine oxides, betaines, sorbitan derivatives, sulfonated alkyls, sulfonated alcohols, sulfates of ethoxylated alcohols, and sulfates of ethoxylated alkyls.

8. The ink-jet ink composition of claim 7 wherein said diphenyl sulfonate derivatives are selected from the group consisting of an n-hexadecyl diphenyloxide disulfonate, an hexadecyl diphenyl ether disulfonate, and an n-decyl diphenyloxide disulfonate; wherein said secondary ethoxylated alcohols are selected from the group consisting of secondary ethoxylated alcohol surfactants predominantly having at least about 9 ethoxylated units; and wherein said amine oxides are selected from the group consisting of N-octyldecenyl-N,N-dimethlyamine oxide and dimethyl myristyl amine oxide.

9. The ink-jet ink composition of claim 1 wherein said at least one second surfactant is present in said ink-jet ink composition at a concentration ranging from about 0.1 to 0.4 wt % of said ink-jet ink composition.

10. The ink-jet ink composition of claim 1 wherein said at least one second surfactant has a hydrophilic-lipophilic balance that is at least about 3 units higher than that of said at least one first surfactant.

11. A method of increasing the wettability and cloud point of an ink-jet ink for ink-jet printing, said ink-jet ink comprising at least one substantially water-soluble dye and a vehicle, said vehicle including at least one first surfactant, wherein said method comprises formulating said ink-jet ink to further include at least one second surfactant having a hydrophilic-lipophilic balance that is at least about 1.5 units higher than that of said at least one first surfactant.

12. The method of claim 11 wherein said at least one first surfactant has a hydrophilic-lipophilic balance of less than about 13 and wherein said at least one second surfactant has a hydrophilic-lipophilic balance of at least about 12.

13. The method of claim 12 wherein said at least one first surfactant is a secondary alcohol ethoxylate surfactant predominantly having 4 to 8 ethoxylated units.

14. The method of claim 13 wherein said secondary alcohol ethoxylate surfactant has an aliphatic chain of about 12 to 18 carbon atoms.

15. The method of claim 14 wherein said secondary alcohol ethoxylate surfactant is selected from the group consisting of secondary alcohol ethoxylate surfactant predominantly having 5 ethoxylated units and an aliphatic chain of about 15 carbon atoms, a secondary alcohol ethoxylated surfactant predominantly having 7 ethoxylated units and an aliphatic chain of about 15 carbon atoms, and mixtures thereof.

16. The method of claim 11 wherein said at least one first surfactant is present in said ink-jet ink composition at a concentration ranging from about 0.5 to 5 wt % of said ink-jet ink composition.

17. The method of claim 11 wherein said at least one second surfactant is selected from the group consisting of diphenyl sulfonate derivatives, secondary ethoxylated alcohols, amine oxides, betaines, sorbitan derivatives, sulfonated alkyls, sulfonated alcohols, sulfates of ethoxylated alcohols, and sulfates of ethoxylated alkyls.

18. The method of claim 17 wherein said diphenyl sulfonate derivatives are selected from the group consisting of an n-hexadecyl diphenyloxide disulfonate, an hexadecyl diphenyl ether disulfonate, and an n-decyl diphenyloxide disulfonate; wherein said secondary ethoxylated alcohols are selected from the group consisting of secondary ethoxylated alcohol surfactants predominantly having at least about 9 ethoxylated units; and wherein said amine oxides are selected from the group consisting of N-octyldecenyl-N,N-dimethlyamine oxide and dimethyl myristyl amine oxide.

19. The method of claim 11 wherein said at least one second surfactant is present in said ink-jet ink at a concentration ranging from about 0.1 to 0.4 wt %.

20. The method of claim 11 wherein said at least one second surfactant has a hydrophilic-lipophilic balance that is at least about 3 units higher than that of said at least one first surfactant.

21. A color ink-jet printer including a set of cyan, yellow, magenta, and black inks, each ink having a composition comprising at least one dye and a vehicle, said vehicle including at least one first surfactant and at least one second surfactant, said at least one second surfactant having a hydrophilic-lipophilic balance that is at least about 1.5 units higher than that of said at least one first surfactant.

* * * * *